July 1, 1947.  J. HARWOOD ET AL  2,423,236
METHOD OF TREATING TALL OIL
Filed Feb. 17, 1944
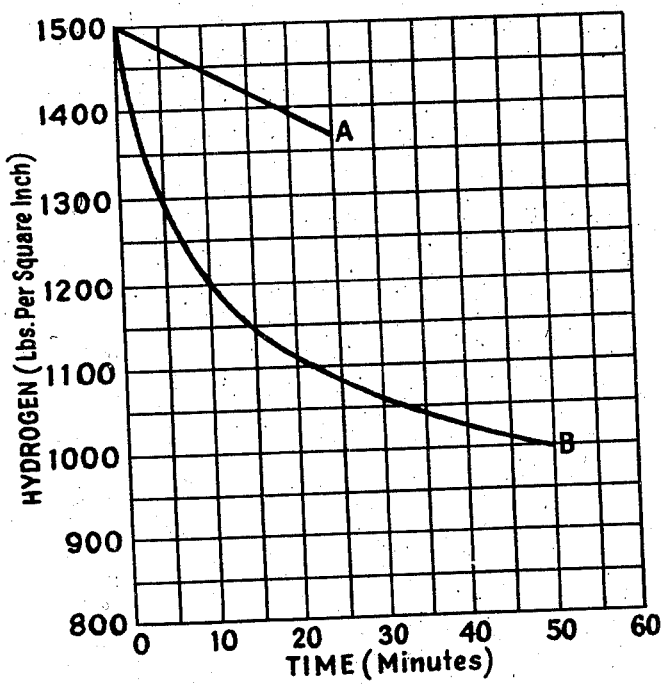
James Harwood and
Evan Francis Binkerd
INVENTORS
BY Carl C. Batz
ATTORNEY

UNITED STATES PATENT OFFICE 2,423,236

METHOD OF TREATING TALL OIL

James Harwood, Western Springs, and Evan Francis Binkerd, Chicago, Ill., assignors to Armour and Company, Chicago, Ill., a corporation of Illinois Application February 17, 1944, Serial No. 522,754

6 Claims. (Cl. 260—97.5)

This invention relates to a method of producing hydrogenated tall oil acids and it specifically relates to a method for improving the hydrogenation of tall oil fatty acids.

Crude tall oil is a product which is available in large quantities as a by-product of paper manufacture and is useful for many purposes. In some of its applications, such as in the preparation of soap, it is desired that the tall oil acids be hydrogenated. However, the hydrogenation of the tall oil acids has, in the past, been exceedingly difficult and very costly with regard to the amount of catalyst required. It has, in the past, been necessary to use large amounts of the customary hydrogenation catalysts and it has been difficult to harden the acids to the degree desired.

For remedying the difficulties met in the hydrogenation of this material several methods have heretofore been proposed. One method involves completely saponifying the tall oil, separating the soaps and then recovering the acids which are then subjected to hydrogenation. Another method has involved a treatment which includes the removal of sulphur prior to hydrogenation, and this has resulted in refining losses of up to 20%. All of the methods so far suggested, to our knowledge, have been expensive and somewhat complex, and an improved method for this purpose is greatly desired in the art.

We have now discovered that the fatty acids of tall oil can be easily hydrogenated by employing a pre-treatment with an alkaline reacting agent. This agent may be, for example, sodium hydroxide, potassium hydroxide, sodium carbonate, potassium carbonate, calcium hydroxide, and the like. It may be added in small amounts either before or after the distillation of the acids, and the distilled acids so treated with the alkaline material are subjected to hydrogenation.

If desired, the crude tall oil may be treated with the alkaline material and then fractionally distilled to obtain a fraction which contains predominantly the fatty acids, and this fraction may then be hydrogenated. Alternatively the crude tall oil may first be fractionally distilled to obtain a fraction which is predominantly fatty acids, the alkaline material may be added to this fatty acid fraction and the fraction so treated may be hydrogenated. Thus the acids may be treated with the alkaline material in either crude or distilled form. Instead of the fractional distillation step which is preferred, a straight distillation step may be substituted by which a distillate is obtained which contains both the fatty acids and the resin acids, and this distillate hydrogenated.

In any event, the tall oil acids, either separately or in their natural mixtures, are reacted with a small amount of an alkaline reacting agent and subsequently hydrogenated.

The amount of the alkaline material added in this improved process should be less than would cause any appreciable saponification of the acids, yet enough is required to render innocuous those elements which in tall oil hinder hydrogenation of the acids contained therein. In general, we find that any appreciable amount of the alkaline material will produce some benefit but we find it preferable not to add in excess of about 2% of the alkaline material, this percentage being based on the quantity of the acids subjected to treatment. We find that the addition of 1% of the alkaline reacting material will produce excellent results. It is not necessary to add water along with the alkaline material although a small amount of water may be added if desired. Upon addition of the alkaline material the crude tall oil or tall oil acids so treated should be thoroughly stirred or agitated so that efficient contact throughout the mass is obtained. Preferably, also, the mixture is heated to dissolve more thoroughly the alkaline reacting material in the acid mass.

If desired, the alkaline material may be added in the form of salts such as the sodium or potassium soaps of fatty acids. We may admix with the tall oil acids or the fatty acid fraction of tall oil a small amount, preferably from 2% to 10%, of an alkali metal salt of a fatty acid suitably having 8 to 20 carbon atoms, such as sodium oleate or potassium palmitate, and then we can hydrogenate the acids so treated by the regular hydrogenation procedure.

We believe that when an alkali such as sodium hydroxide is admixed with the tall oil acids in accordance with our invention, the alkali first reacts with a very small portion of the acids to form salts or soaps, and that upon continued agitation the salt or soap so formed comes into contact with all parts of the acids, and in some way, not now clear, conditions the acids for improved hydrogenation. The amount of the alkali or alkaline reacting material should not be sufficient to produce a substantial degree of saponification, and in no case is it necessary to saponify more than 5% of the acids.

In the treatment of the acids with the alkaline material, the acids may be held in a vat equipped with a mechanical agitator and suitable heating elements. The alkaline material may be added in the amounts above indicated and the mixer operated for from 10 to 120 minutes with the temperature being raised to about 200° F. The alkaline material is thus brought into contact with all portions of the acid mass, and leaves an effect on the acid material which becomes very apparent during the subsequent hydrogenation procedure.

The hydrogenation of the pre-treated distilled tall oil acids may be carried out under the temperature and pressure conditions customarily employed for the hydrogenation of fatty acid substances, such as cottonseed oil and soybean oil. For example, the use of an initial pressure of 1,500 pounds per square inch and a temperature of 150° C. have been found quite satisfactory. Hydrogen gas may be blown into the acids at the usual elevated temperatures and pressures to effect the hydrogenation of the acids. Any of the usual hydrogenation catalysts may be employed of which nickel formate is a typical example. In the improved process it is not necessary to use an excessive amount of catalyst, and we find that it is satisfactory to use nickel formate catalyst in the amount of 0.2% of the acids subjected to the process. It is possible to use lesser amounts of catalyst than this, and greater amounts may be used but to no practical advantage.

We do not know just what the mechanism of the reaction in this process is. We believe that the alkaline reacting agent renders harmless several as yet unidentified catalyst poisons. Although we have made many tests we do not at this time know the exact nature of these catalyst poisons or detrimental substances, and we do not know the exact mechanism by which in this process these substances are eliminated or rendered harmless.

It is a distinct advantage of our process that significantly less catalyst is required to hydrogenate the tall oil acids than has heretofore been necessary. It is also an advantage of this process that these acids can be hydrogenated to the degree desired. In the prior attempts at hydrogenation of tall oil acids, it has not been possible to obtain a high degree of hydrogenation even with excessive amounts of catalyst while in the present process it is possible to obtain a high degree of hydrogenation while at the same time keeping to a minimum the amount of catalyst used.

The beneficial effects of the improved process are clearly illustrated by the accompanying drawing wherein the figure given is a graph containing curves which describe the hydrogenation of distilled steam-blown tall oil fatty acids. The curves given on this graph were obtained by carrying out the hydrogenation of tall oil fatty acids in a Parr hydrogenation bomb using nickel formate catalyst. An initial pressure of 1,500 pounds per square inch and a temperature of 150° C. were employed. The rate of hydrogenation and the amount of hydrogen taken up by the substance hydrogenated are indicated by the drop in pressure during the period of treatment. This graph shows pressure plotted against the hydrogenation time given in minutes. The curve designated A represents the hydrogenation of a tall oil fatty acid which has been prepared by fractionally distilling crude steam-blown tall oil. The fatty acid material which was hydrogenated in this instance was a fraction which contained predominantly the fatty acids of tall oil. The curve designated B represents the hydrogenation of a tall oil fatty acid material which was especially treated in accordance with the present invention. In this instance, crude tall oil was treated with 1% of sodium hydroxide and the tall oil so treated was then distilled in the same way as was the material used in the hydrogenation represented by curve A, and the fatty acid fraction obtained from the specially treated tall oil was hydrogenated to give the values shown by the curve B. It is obvious that the hydrogenation represented by curve B is far more efficient than that represented by curve A. These comparative results are presented in order to illustrate more clearly the effect of the pre-treatment with the alkaline material which effect we cannot explain in theory.

The following examples will serve to further clarify the process of our invention as applied to specific conditions.

*Example I*

To 400 grams of crude tall oil are added 4 grams, or 1%, of sodium hydroxide dissolved in 4 grams of water. The mixture is thoroughly stirred for ten minutes and then fractionally distilled to recover a fraction consisting principally of fatty acids. The alkali is not removed prior to the distillation. To 100 grams of the fatty acid fraction is added 0.2 gram of nickel catalyst and the mixture is hydrogenated in a Parr bomb at a pressure of 1,500 pounds per square inch and a temperature of 150° C. The drop in pressure, corresponding to absorption of hydrogenation by the fatty acids, is 350 pounds per square inch by the end of 15 minutes. Tall oil which had been similarly treated except that it had not been reacted with alkali exhibited a drop in pressure of only 75 pounds per square inch in 15 minutes under the same conditions. The total drop in pressure for the treated sample is 500 pounds per square inch in 50 minutes.

*Example II*

Crude tall oil is fractionally distilled to obtain a low boiling fraction containing predominantly fatty acids. To 100 grams of the fatty acid fraction so obtained is added 1 gram of sodium carbonate and the mixture stirred and heated until the sodium carbonate has dissolved. To this mixture is added 0.2 gram of nickel catalyst and hydrogenation is carried out at a pressure of 1,500 pounds per square inch and a temperature of 150° C. The drop in pressure is 530 pounds per square inch in 60 minutes and the product has an iodine number of 30.

*Example III*

400 grams of tall oil fatty acids are mixed with 1% of sodium hydroxide and the mixture fractionally distilled to obtain a fraction containing principally fatty acids. This fatty acid fraction is then hydrogenated in the presence of 0.2 gram of nickel formate catalyst. The drop in pressure is 550 pounds per square inch in 60 minutes and the product has an iodine number of 20.

As before stated, the alkali or alkaline material may be added to the crude tall oil before the fatty acid fraction is separated therefrom and the hydrogenation of the fatty acids thereby beneficiated, or the alkali may be added to the separated fatty acid fraction prior to its hydrogenation. In the latter case, the alkaline agent is preferably added in an anhydrous condition. Also, it is possible to hydrogenate a tall oil acid practising the pre-treatment step with an alkaline material, characteristic of our invention.

By the terms "alkaline material" and "alkaline reacting agent" as used herein, we mean the hydroxides, carbonates and acetates of the alkali metals, alkaline earth oxides, hydroxides, carbonates, and the like. Included also are the alkaline salts or soaps of fatty acids.

The foregoing detailed description is given for the purpose of explanation only and is not intended in a limiting sense, and many changes may be made in the manner of carrying out the process without departing from the spirit of our invention.

Having now described the invention, what we wish to claim is:

1. A process for producing hydrogenated tall oil acids comprising treating tall oil acids with an alkaline material in an amount insufficient to saponify more than 5% of said acids, and hydrogenating the tall oil acids so treated.

2. A process for producing hydrogenated tall oil acids comprising treating tall oil acids with an alkaline material in an amount not to exceed 2% based on the amount of the acids treated, and hydrogenating the tall oil acids so treated.

3. A process for producing hydrogenated tall oil fatty acids comprising treating crude tall oil with an alkaline material in an amount insufficient to saponify more than 5% of said acids, fractionally distilling the tall oil thus treated to produce a fraction containing predominantly fatty acids, and hydrogenating the fatty acid fraction so obtained.

4. A process for producing hydrogenated tall oil fatty acids comprising fractionally distilling tall oil to produce a fraction containing predominantly fatty acids, treating said fatty acid fraction with an alkaline material in an amount of 2 to 10% of said fatty acids and hydrogenating the tall oil fatty acid fraction so treated.

5. A process for producing hydrogenated tall oil fatty acids comprising intimately admixing with tall oil fatty acids a small amount of an alkaline material, said material being insufficient to saponify more than 2 to 10% of said acids, and hydrogenating the tall oil fatty acids so treated.

6. A process for producing hydrogenated tall oil acids comprising intimately admixing with tall oil acids an alkali soap of a fatty acid having at least 8 carbon atoms in an amount insufficient to saponify more than 5% of said acids, and hydrogenating the tall oil acids so treated.

JAMES HARWOOD.
EVAN FRANCIS BINKERD.

REFERENCES CITED

The following references are of record in the file of this patent:

UNITED STATES PATENTS

| Number | Name | Date |
|---|---|---|
| 1,132,710 | Ellis | Mar. 23, 1915 |
| 2,235,462 | Murdock | Mar. 18, 1941 |
| 2,276,517 | Segessemann | Mar. 17, 1942 |
| 2,337,235 | Farber | Dec. 21, 1943 |

FOREIGN PATENTS

| Number | Country | Date |
|---|---|---|
| 21,477 | Great Britain | 1913 |